(12) United States Patent
Sendhoff et al.

(10) Patent No.: US 7,831,418 B1
(45) Date of Patent: Nov. 9, 2010

(54) AUTONOMOUS EXPERIMENTAL DESIGN OPTIMIZATION

(75) Inventors: Bernhard A. Sendhoff, Bruchköbel (DE); Edgar Körner, Seligemstadt (DE); Andreas Richter, Rodgau (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 1031 days.

(21) Appl. No.: 10/456,179

(22) Filed: Jun. 5, 2003

(30) Foreign Application Priority Data

Jun. 21, 2002 (EP) .................................. 02013826

(51) Int. Cl.
*G06G 7/48* (2006.01)
*G05B 13/02* (2006.01)
*G06F 19/00* (2006.01)

(52) U.S. Cl. .............................. 703/6; 700/29; 700/97; 703/8

(58) Field of Classification Search ..................... 703/6, 703/8; 700/29, 97
See application file for complete search history.

(56) References Cited

U.S. PATENT DOCUMENTS

| | | | | |
|---|---|---|---|---|
| 3,914,990 | A * | 10/1975 | Borg | 73/670 |
| 5,374,011 | A * | 12/1994 | Lazarus et al. | 244/99.8 |
| 5,510,995 | A * | 4/1996 | Oliver | 700/182 |
| 5,887,828 | A * | 3/1999 | Appa | 244/215 |
| 6,285,968 | B1 * | 9/2001 | Motoyama et al. | 703/1 |
| 6,419,187 | B1 * | 7/2002 | Buter et al. | 244/35 R |
| 6,430,993 | B1 * | 8/2002 | Seta | 73/146 |

FOREIGN PATENT DOCUMENTS

EP 1235180 A 8/2002
JP 09-325949 12/1997

OTHER PUBLICATIONS

Markus Olhofer et al., "Adaptive encoding for aerodynamic shape optimization using Evolution Strategies", pp. 576-583, May 27-30, 2001.*

CEC2001, "Proceedings Congress on Evolutionary Computation 2001", May 27-30, 2001, COEX, Seoul, Korea.*

Markus Olhofer et al., "Adaptive encoding for aerodynamic shape optimization using Evolution Strategies", pp. 576-583, May 27-30, 2001.*

(Continued)

*Primary Examiner*—David Silver
(74) *Attorney, Agent, or Firm*—Fenwick & West LLP

(57) ABSTRACT

Iterative (nondeterministic) optimization of aerodynamic and hydrodynamic surface structures can be accomplished with a computer software program and a system using a combination of a variable encoding length optimization algorithm based on an evolution strategy and an experimental hardware set-up that allows to automatically change the surface properties of the applied material, starting with the overall shape and proceeding via more detailed modifications in local surface areas. The optimization of surface structures may be done with a computing device for calculating optimized parameters of at least one (virtual) surface structure, an experimental hardware set-up for measuring dynamic properties of a specific surface structure, and an interface for feeding calculated parameters from the computing device to the experimental set-up and for feeding measured results back to the computing device as quality values for the next cycle of the optimizing step.

15 Claims, 6 Drawing Sheets

Autonomous Experimental Aerodynamic Design Optimization

OTHER PUBLICATIONS

Otto, John, "A surrogate approach to the experimental optimization of multielement airfoils", AIAA Paper 96-4138-CP, Jul. 12, 1996.*

Jacob, "On the Fluid Dynamics of Adaptive Airfoils", Proceedings of the ASME International Mechanical Engineering Congress and Exposition, Nov. 15-20, 1998, pp. 1-10.*

Markus Olhofer, "Adaptive encoding for aerodynamic shape optimization using Evolution Strategies", pp. 576-583, May 2001.*

Otto, "A surrogate approach to the experimental optimization of multielement airfoils", AIAA, Jul. 1996.*

Barnes, J. Wesley et al., "An Overview of Tabu Search Approaches to Production Scheduling Problems", Intelligent Scheduling Systems, 1995, pp. 101-127, Kluwer Academic Publishers.

Otto, John C. et al., "A Surrogate Approach to the Experimental Optimization of Multielement Airfoils", American Institute of Aeronautics and Astronautics, AIAA Paper 96-4138-CP [online] Jul. 12, 1996 [Retrieved on Dec. 14, 2005] Retrieved from the Internet: <URL: http://techreports.larc.nasa.gov/ltrs/PDF/NASA-aiaa-96-4138.pdf>. 12 pages.

Sbalzarini, Ivo F. et al., "Evolution Strategies for Computational and Experimental Fluid Dynamic Applications", Proceedings of the Genetic and Evolutionary Computation Reference (GECCO-2001), 2001, Morgan Kaufman Publishers, San Francisco, CA.

European Search Report, European Application No. 02013826, Sep. 27, 2002. 6 pages.

Jacob J D, "On the Fluid Dynamics of Adaptive Airfoils", Proceedings of the 1998 ASME international Mechanical Engineering Congress and Exposition, Nov. 1998, pp. 1 and 7, Anaheim, CA, US.

Olhofer M et al, "Adapting Encoding for Aerodynamic Shape Optimization Using Evolution Strategies", Proceedings of the 2001 Congress on Evolutionary Computation, IEEE CAT. No. 01TH8546, May 27-30, 2001, pag 576-83 vol. 1, NJ, US.

Jacob J D at al, "Aerodynamic Flow Control Using Adaptive Surfaces", Proceedings of the ASME $17^{th}$ Biennial Conference on Mechanical Vibration and Noise, Symposium on Structronics, Mechatronics. and Smart Materials, Sep. 1999, pp. 3 and 5, Las Vegas, NV, US.

Sbalzarini I F et al, "Evolustion Strategies for Computational and Experimental Fluid Dynamic Applications", Proceedings of the Genetic and Evolutionary Computation Converence (GECCO-2001), Nov. 7, 2001, pag 1064-71.

Sasaki D at al, "Aerodynamic Shape Optimization of Supersonic Wings by Adaptive Range Multiobjective Genetic Algorithms", Evolutionary Multi-Criterion Optimization, First International Conference, EMO 2001. Proceedings (Lecture Notes in Computer Science vol. 1993). Evolutionary Multi-Criterion Optimization, pp. 639-652, Berlin, Germany.

Muyl F et al, "Hybrid Method for Aerodynamic Shape Optimization in Automotive Industry", Abstract submitted for Proceedings of the Conference for Applied Mathematics for Industrial Flow Problems—AMIF 2002. Online!, Oct. 2001, Lisbon, Portugal. Retrieved from the Internet at http://www.dma.ens.fr/{ldumas/Lisbon02.pdf on Sep. 25, 2002.

Kodiyalam S et al, "Multidisciplinary Design Optimization—Some Formal Methods, Framework Requirements and Application to Vehicle Design", Int. Journal of Vehicle Design (Special Issue), pp. 3-22, 2001.

* cited by examiner

Fig. 1: Autonomous Experimental Aerodynamic Design Optimization

Fig. 2: Piston Devices for Altering the Surfaces of the Design (alternatively magnets with varying strength could be used)

Fig. 3: Discrete Representation of a Surface with an Example of a Virtual Block Definition Fig. 4: Continuous Representation of a Surface with Underlying Pistons and Flexible Top Material Fig. 5: Integration of Experimental Optimization in a Design Optimization Framework consisting of CFD-based and Meta-Model based Evaluation

AUTONOMOUS EXPERIMENTAL DESIGN OPTIMIZATION

RELATED FOREIGN APPLICATIONS

This application is related and claims priority to European Patent Application No. 02 013 826.9 filed on Jun. 21, 2002 by Bernhard Sendhoff, Edgar Korner, and Andreas Richter, titled "Autonomous Experimental Design Optimization".

FIELD OF THE INVENTION

The underlying invention generally relates to the optimization of aerodynamic and hydrodynamic designs, in particular to methods for an iterative (non-deterministic) optimization of hydrodynamic and aerodynamic surfaces, e.g., aircrafts, ships and vehicles, a computer software program for implementing such a method as well as to systems for optimizing said surfaces.

BACKGROUND OF THE INVENTION

Some aspects of the invention involve the advantageous use of technologies known in the art. In the following description some of these basic technologies will be introduced, for example, CFD, Gradient based methods, Evolutionary Algorithms (EA), and Artificial 25 Neuronal Networks (ANN).

Computational Fluid Dynamics (CFD) has become an integral part of aero/hydro-dynamic design processes, as, for example, the aircraft design process. It involves the use of computational methods to solve systems of nonlinear partial differential equations in order to predict how fluids will flow, and what will be their quantitative effects on the solids they are in contact with. Thereby, CFD complements experimental and theoretical fluid dynamics by allowing the efficient simulation of physical fluid systems. Another advantage CFD provides is the ability to model physical fluid phenomena that are difficult to measure in actual experiments. However, CFD simulations are computationally very expensive. What makes the problem more difficult is that EAs need a relatively large number of evaluations in order to achieve a near optimal aerodynamic design. To solve this dilemma, Artificial Neural Networks (ANN) can be used to approximate CFD computations.

ANNs are an important tool in soft computing that can advantageously be applied to solve a plurality of problems. The original purpose of an ANN is to simulate a biological neural system (e.g. a brain). To date, several neural network models have been developed, which can be applied to function approximation, classification, control tasks, and the like. An important issue that is closely related to ANNs is learning. Thereby, learning theory in ANNs has large overlap with that in Machine Learning (ML), Bayesian Theory and statistics.

In the following some background on optimization algorithms will be provided. The most well known ones are gradient-based methods (GMs), which probe the optimum by calculating local gradient information. These methods are efficient and the optimum obtained from these methods will be a global one, if the objective and constraints are differentiable and convex. Consequently, this approach has been widely used for many design problems including wing design, nozzle design, supersonic wing-body design, and more complex aircraft configurations. The quality landscape for an aerodynamic design problem, however, is usually multimodal. For GMs to find a global optimum, the optimization process has to be started repeatedly from a number of initial points and then checked for consistency of the obtained optima. In this sense, GMs are neither efficient nor robust for design optimization. Furthermore, for design optimization problems, the gradient information needed by GMs must be numerically estimated. This process can be computationally expensive and in general it is not very robust against noise.

By contrast, soft computing techniques such as Evolutionary Algorithms (EAs) form a new kind of iterative pseudostochastic optimization techniques that try to emulate mechanisms of natural evolution, where a biological population evolves over generations to adapt to its environment by means of selection, recombination and mutation. Such a population consists of a number of individuals composed of chromosomes, which are in turn composed of genes. These genes encode the parameters that need to be optimized for a given problem. If an EA is used for structure optimization, the parameters that describe said structure are encoded in said chromosomes. To eliminate unfavorable modifications and to proceed with modifications that increase the overall quality of the underlying population, a selection operation is used. Since techniques from computational intelligence like Evolutionary Algorithms (EAs) that employ objective function information (fitness values) instead of derivatives or other auxiliary knowledge—are known to be very robust, they have been enjoying an increasing popularity in the field of numerical optimization for practical engineering applications in recent years. EAs have been applied to aeronautical problems in several ways, including parametric and conceptual design of an aircraft, preliminary design of turbines, topological design of non-planar airfoils and aerodynamic optimization based on CFD.

Originally, there were three main streams of evolutionary computation—namely Genetic Algorithms (GA), Evolution Strategies (ES) and Evolutionary Programming (EP). More recently, Genetic Programming (GP) has been developed and has matured into the fourth major direction. When EAs are applied to optimization problems, individuals, genes and fitness values usually correspond to a design candidate, a number of design variables and an objective function value, respectively. One of the key features of EAs is that these algorithms search the design space population based, instead of moving from a single point like GMs do. Moreover, due to their stochastic component and the recombination of individuals the global optimum can be found, for most EAs theoretically even with probability one. Other advantages such as robustness, efficiency, suitability to parallel computing and simplicity make them particular useful candidates for a combination with CFD methods. The number of parameters (design variables) and the way in which the parameters describe the structure or surface, e.g., B-splines, Polygons, or alternative codings, are usually called the representation or the encoding of the design in evolutionary algorithms.

Experimental design optimization techniques using evolutionary algorithms (EAs) in particular evolution strategies, for example, as described in "Evolutionstratgie '94" (Frommann-Holzboog Verlag, 1994, incorporated herein by reference in its entirety) by I. Rechenberg and "Experimentelle Optimierung einer Zweiphasenduse-Teil (AEG Forschungsinstitut Berlin, Bericht 35-11.034/68, 1968, incorporated herein by reference in its entirety) by H.-P. Schwefel was one of the first application domains of this type of optimization methods. The necessary changes of the experimental design were carried out manually by adjusting devices that changed the design subject to said optimization. An example for this technique is the optimization of a pipe for re-directing the flow of a fluid or gas 90 degrees, in which screws were attached to the flexible material of the pipe. In this case, the employed evolution strategy was restricted to a (1+1)-population, so that the manual adjustment process remained feasible.

In "A Surrogate Approach to the Experimental Optimization of Multi-Element Airfoils" (Multi-Disciplinary Optimization Branch, NASA Langley Research Center March, 1996, Report RTR 505-59-53-08, incorporated herein by reference in its entirety) by J. C. Otto, D. Landman and A. T. Patera, the process described above is applied to the optimization of a multi-element airfoil, in which actuators are used to position the flap relative to the main element (2D change). Again, the measurement process is performed autonomously, the results are transmitted to the optimization algorithm, which uses a steepest ascent method and determines the best set-up of the relative wing positions for the next test.

In the article "Evolution Strategies for Computational and Experimental Fluid Dynamics Applications" (L. Spector, et al. (editors): Proceedings of the Genetic and Evolutionary Computation Conference (GECCO-2001), Morgan Kaufmann Publishers, San Francisco, Calif., 2001, incorporated herein by reference in its entirety) by F. Sbalzarini, S. D. Mueller, P. Koumoutsakos and G.-H. Cottet, an optimization of trailing vortices distraction using evolution strategies is disclosed. Thereby, Sbalzarini et al. study an implementation of two- and multi-membered evolution strategies to optimization problems for CFD applications in an experimental and computational environment, respectively.

SUMMARY OF THE INVENTION

Generally, the invention proposes a closed-loop combination of an optimization algorithm running on a computing device and an experimental hardware set-up that allows to automatically change the surface properties of the applied material.

In view of the explanations mentioned above, it is an object of the invention to propose a method for an efficient 35 optimization of the structure of a surface. This and other objects and advantages of the invention are apparent in the following detailed description and drawings. This written description and accompanying drawings are not to be construed as limiting the invention as it is recited in the attached claims.

One embodiment according to the underlying invention is generally dedicated to the use of optimization methods for design parameters of aerodynamic and hydrodynamic surfaces. In this context, the invention presents a method for the optimization of specific structures (and not only of a single parameter) of surfaces, e.g., of aircrafts, ships and road vehicles, a computer software program for executing such a method and a system for optimizing said surface structures.

For this purpose, in one embodiment, a hybrid approach is proposed which encompasses a combination of an optimization algorithm, thereby realizing a closed loop for an autonomous experimental optimization, and an experimental hardware setup that can be used for modifying the (three-dimensional) surface of an aerodynamic or hydrodynamic body by automatically altering specific surface properties of the applied material. The method can start with the overall shape and proceed via more detailed modifications in local surface areas. The model, structure, shape or design to be optimized is described by parameter sets that comprise different object parameters. As mentioned before, the number of parameters and the way in which they describe the design is generally called the representation.

In another embodiment using an evolution strategy, these object parameters are mutated to create offsprings of the parameter set. After that, the quality of these offsprings is evaluated. The parameter set furthermore comprises at least one strategy parameter representing the step size of the mutation (e.g., the variance of the normal distribution of associated object parameters).

Using different techniques from computational intelligence (e.g., ANNs and evolutionary computing methods) in order to solve complex optimization problems within a hybrid-approach embodiment as described above, has several advantages. For example, the approximation strength of ANN can be combined with experimental and CFD based evaluation methods of the design candidates to speed up the optimization process, which in turn is based on evolutionary algorithms to be able to search the quality landscape globally.

In another embodiment of the present invention, it is proposed a method for the optimization of surface structures which comprises the steps of optimizing parameters of at least one (virtual) surface structure, adjusting the surface structure of an experimental set-up according to the optimized parameters, measuring dynamic properties of the adjusted experimental surface structure, and feeding measured results back as quality values for the next cycle of the optimizing step. According to another aspect of the present invention a method for a hierarchical design optimization is also proposed, wherein in addition to the values of the parameters, the representation of the design and correspondingly the experimental set-up can be adapted (mutated) during the optimization process.

Furthermore, another embodiment of the invention refers to the usage of these methods for the optimization of road vehicle surfaces. Moreover, these embodiments can be produced in several mediums, for example, a computer software program which implements the methods when executed in a computer system.

Finally, yet another embodiment of the present invention involves a system for the optimization of surface structures, which comprises a computing device for calculating optimized parameters of at least one (virtual) surface structure, an experimental set-up for measuring dynamic properties of a specific surface structure, and an interface for feeding calculated parameters from the computing device to the experimental set-up and for feeding measured results back to the computing device as quality values for the next cycle of the optimizing step.

BRIEF DESCRIPTION OF THE DRAWINGS

Further advantages and possible applications of the underlying invention will become evident from the following description of the preferred embodiment of the invention, which is depicted in the following drawings.

DETAILED DESCRIPTION OF THE INVENTION

Figure 1:
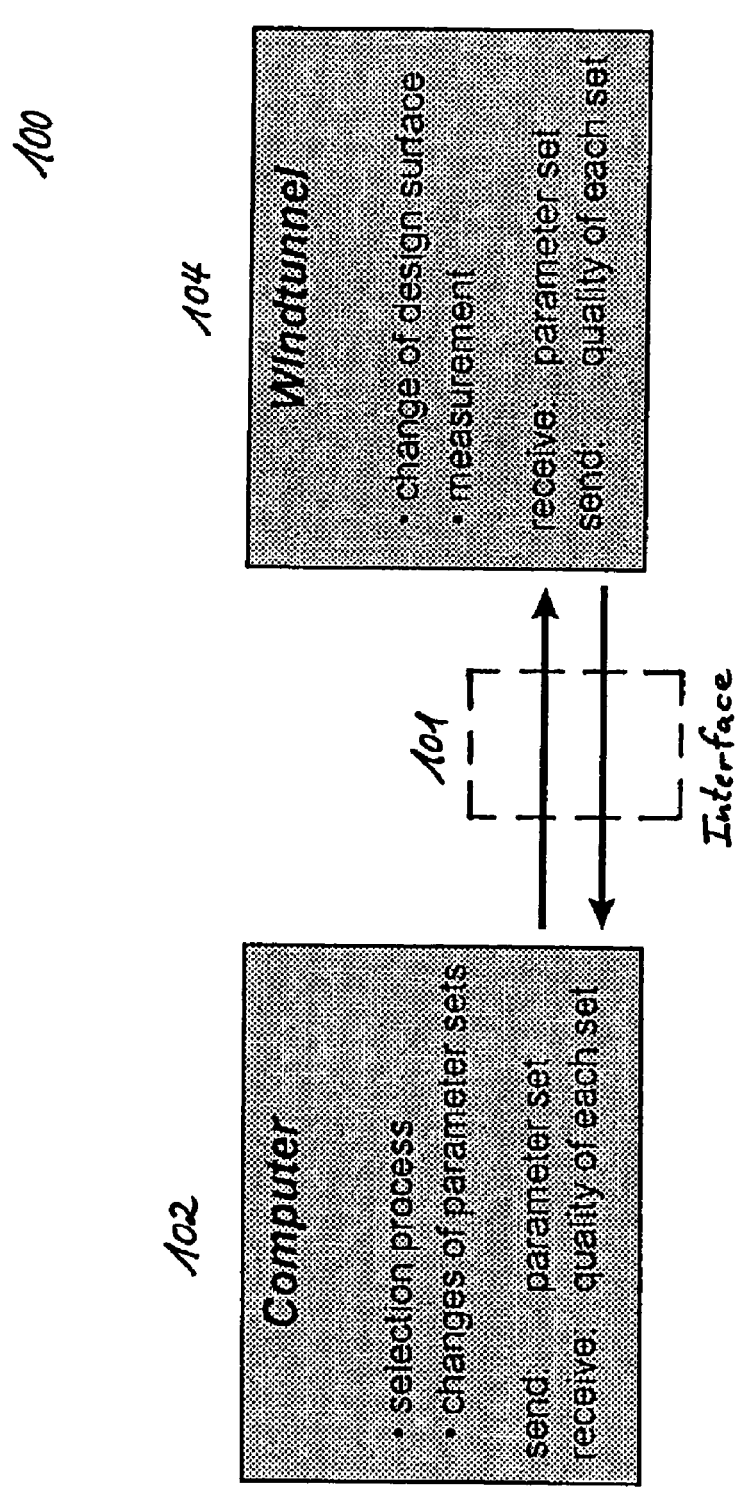
FIG. 1 presents an overview diagram showing the principle of the autonomous experimental aerodynamic design optimization technique.

In the following description, embodiments of the present invention as depicted in FIGS. 1 to 6 shall be explained in detail. As an overview, the following is a brief description of the elements in the diagrams, charts, and illustrations of the figures.

System 100 embodies the principle of the autonomous experimental aerodynamic design optimization technique according to the one embodiment of the present invention. Interface 101 is the interface between the computing device 102 and the wind tunnel 104 in one embodiment of the present invention. Computing device 102 is a client PC needed for the selection process according to the evolution strategy and the calculation of optimized parameter sets according one optimization algorithm embodiment of the present invention. Server 103 is a first application server connected to the client PC 102 via the Internet 504 or any corporate network (Intranet), which hosts the optimization algorithm according to one embodiment of the present invention. Server 103a is a second application server connected to the first application server 103, which is needed for the CFD-based evaluation 502a according to an optimization algorithm embodiment of the present invention. Server 103b is a third application server connected to said first application server 103, which is needed for the meta-model based evaluation 502b according to an optimization algorithm embodiment of the present invention. Windtunnel 104 is needed for the experimental evaluation, which is used to change the underlying design surface of aircrafts and road vehicles and to measure their fluid dynamics, air resistance index, and the noise according to one embodiment of the present invention.

Figure 2:
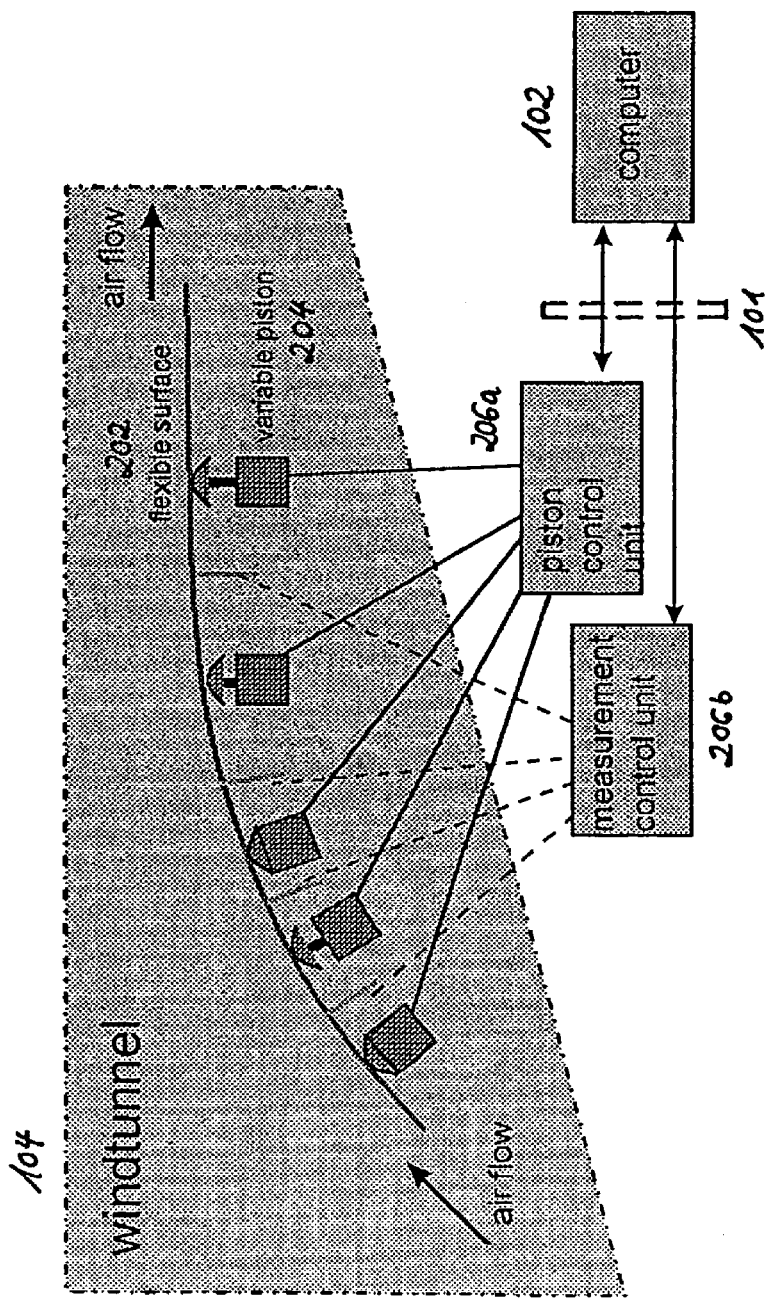
FIG. 2 presents an experimental hardware set-up with devices for altering the surface structure of the design according to the present invention.

Now referring to FIG. 2, experimental set-up 200 is one embodiment of an experimental hardware set-up according to one embodiment of the present invention. This embodiment comprises actuator devices 204 needed for altering the flexible surface material 202, which is a flexible (magnetic) surface material of the design altered by a number of variable actuator devices 204. Actuator devices 204 may be variable piston devices or magnets needed for altering the flexible surface material 202 of the design. In addition, the actuator devices 204 are controlled by a device control unit 206a. The system 200 further comprises a measurement control unit 206b.

Figure 3:
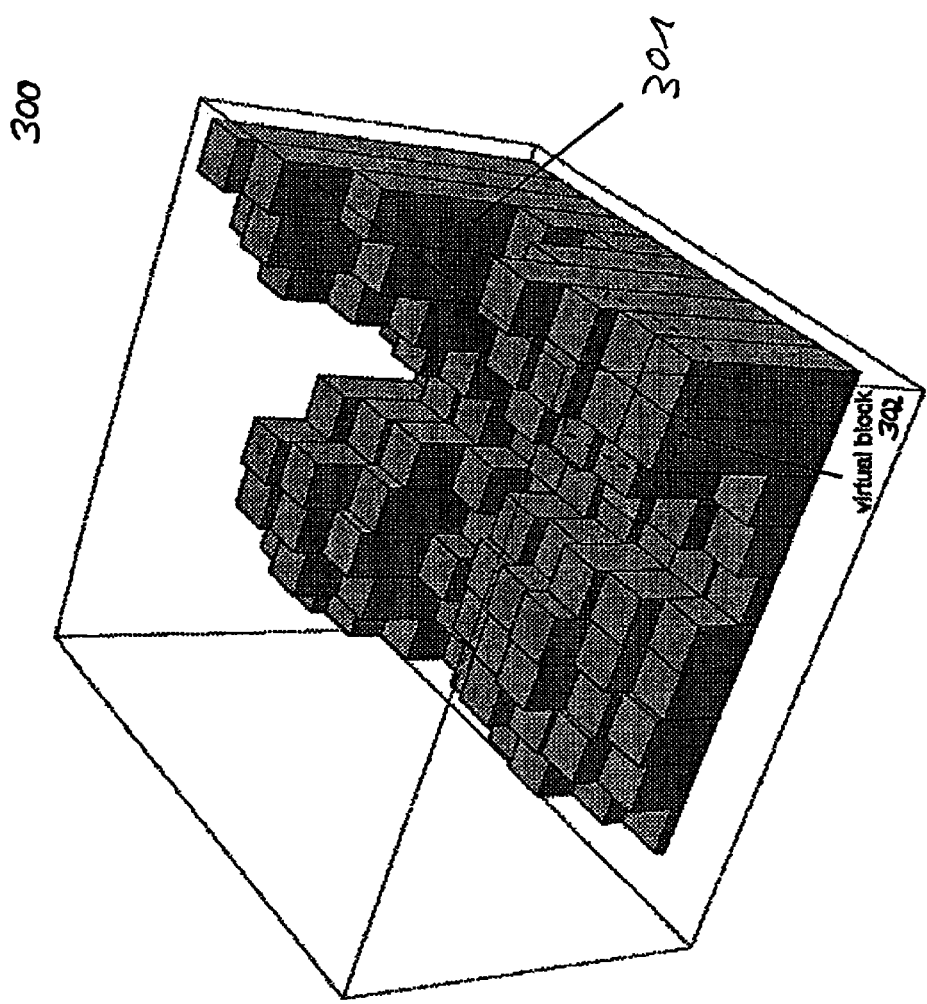
FIG. 3 exhibits a 3D diagram that shows a discontinuous (discrete) representation of a surface with an example of a virtual block definition according to the present invention.

Now referring to FIG. 3, 3D discrete diagram 300 shows a discontinuous (discrete) representation of a surface 202 with an example of a virtual block definition 302 according to one embodiment of the present invention. Cuboids 301 or rectangular parallelepipeds serve as adjustment elements that are used for a modification and aerodynamic optimization of a discontinuous (discrete) surface 300 according to one embodiment of the present invention. Virtual block 302, consists of four cuboids 301 having the same length and the same cross-sectional area according to one embodiment of the present invention.

Figure 4:
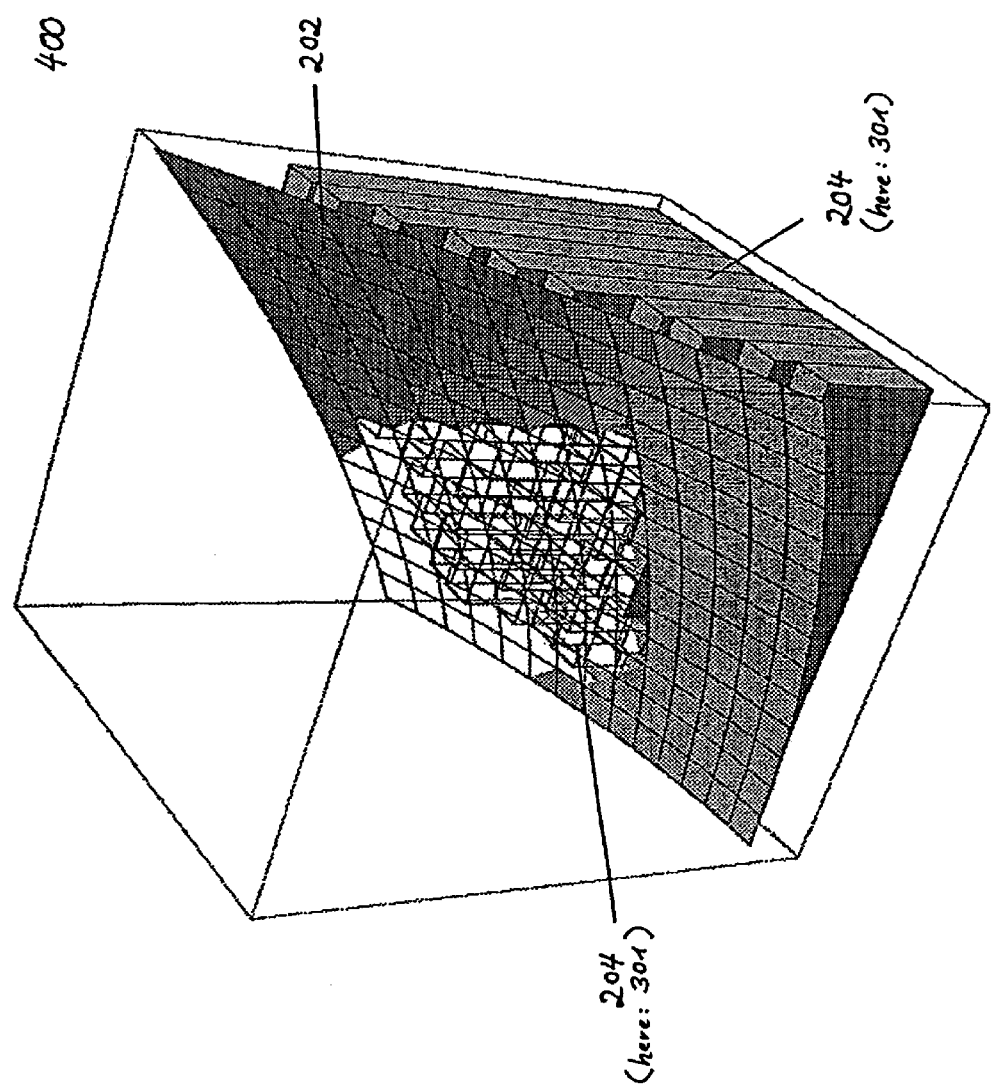
FIG. 4 exhibits a 3D diagram that shows a continuous (smooth) representation of a surface with underlying pistons and a flexible surface material according to the present invention.

Now referring to FIG. 4, 3D smooth diagram 400 shows a continuous (smooth) representation of a surface 202 with underlying pistons and a flexible surface material according to one embodiment of the present invention.

Figure 5:
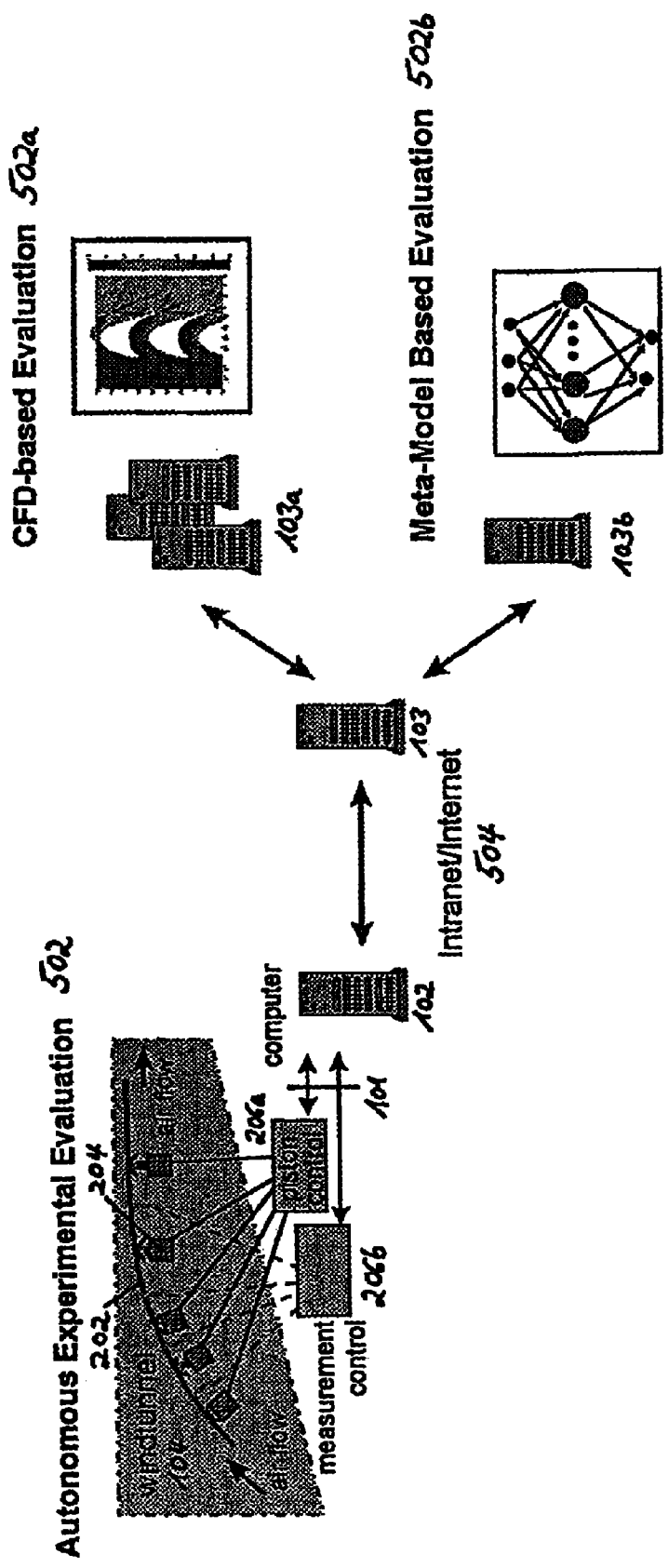
FIG. 5 illustrates the integration of the experimental optimization process in a design optimization framework consisting of a CFD-based and meta-model-based evaluation according to the present invention.

Now referring to FIG. 5, system 500 is shown as an integration of an experimental optimization process in a design optimization framework consisting of a CFD-based and meta-model based evaluation according to embodiment of the present invention. Process 502 represents an autonomous experimental evaluation of the parameter sets according to one embodiment of the present invention. Sub-process 502a represents a CFD-based evaluation as a first part of the hybrid optimization algorithm according to embodiment of the present invention. Similarly, sub-process 502b represents a meta-model based evaluation as a second part of an optimization algorithm embodiment of the present invention. As previously mentioned, the system is interconnected by network 504, which in one embodiment could be the Internet, a corporate network (Intranet), or the like.

In one approach proposed within the scope of one embodiment of the present invention, the autonomous experimental optimization can be combined with a hierarchical design optimization approach. Surface properties of the applied materials 202 are autonomously changed in an experimental set-up 200. As depicted in FIG. 1, their fluid dynamics and other properties are measured and fed back to the computing device (client) 102 that hosts the optimization algorithm. The computing device and the experimental set-up are connected with each other by means of an interface to thus form a closed-loop. In the following description, some characteristics of this approach shall be described:

Autonomy: The whole process operates without the necessity of a manual controller. The surface shape 202 is modified automatically with the aid of suitable actuator devices 204 described below and controlled by an appropriate optimization algorithm residing in a computer 103. Those surface properties that are the subject of optimization are measured, and then the results are further processed in the next optimization step of the algorithm inside the computer.

Surface properties: The surface 202 of a design is represented in an experimental set-up 200, which allows the hierarchical alteration of the structure of surface 202. For example, two main cases can be distinguished, in which either a discontinuous approximation or a continuous representation of the surface 202 is applied. In case a discontinuous (discrete) approximation 300 of the surface 202 is desired, metallic cuboids 301 of variable size that directly represent the surface 202 are used, and the properties of a three-dimensional grid are measured directly. The length of these cuboids 301 can be controlled by a computer 102, e.g., by using micro motors as shown in FIG. 3. The depicted application could be used for an optimization of the underside of a car. In case of a continuous (smooth) surface representation 400, several embodiments of methods according to this principle of the invention are proposed on how such an experimental set-up 200 could be achieved.

In one embodiment, the surface 202 consists of a flexible material, whose shape is controlled by a two-dimensional array of pistons 204 that vary in length and in the force they exert on the surface 202. Examples are shown in FIG. 4 and a sample set-up in a 2D scenario in FIG. 2. Other embodiments can be designed using indirect methods instead of the direct connection of the pistons 204 to the surface 202, e.g., where magnets may exert the force on the surface 202.

In another embodiment, the surface 202 is filled with a material that can be used to alter its shape. Pockets of possibly variable size can be filled with a liquid (e.g. water or oil) or a gas. By varying the pressure of the liquid the shape of the surface 202 changes, which is basically similar to an inflatable mattress. Again, the pressure is controlled via the computer 102, and necessary containers can be hidden inside the design (e.g. the cockpit in the case of a racing car).

In yet another embodiment, the material of the surface 202 is of such a kind that its shape can directly be controlled e.g. with the aid of electrical currents of varying strength. In this case, the electrical field or direction/strength of the electrical current has to be varied in such a way that the desired shape can be produced. For example, materials with a memory of their shape and with varying stiffness (according to electrical fields) can be used.

Hierarchical design optimization: The term "hierarchical design optimization" encompasses different aspects. Generally, the optimization can be carried out on different hierarchical levels, as, e.g., regarding the range (fine/rough optimization), time scale, and the representation of the design and the experimental set-up. Generally not only the parameter values, but also the representation of the design as well as the corresponding experimental set-up characteristics can be modified ("mutated" in case an evolutionary algorithm is used for the optimization). The modification of the representation can be achieved in the experimental set-up by different methods, some of which are described below.

Figure 6:
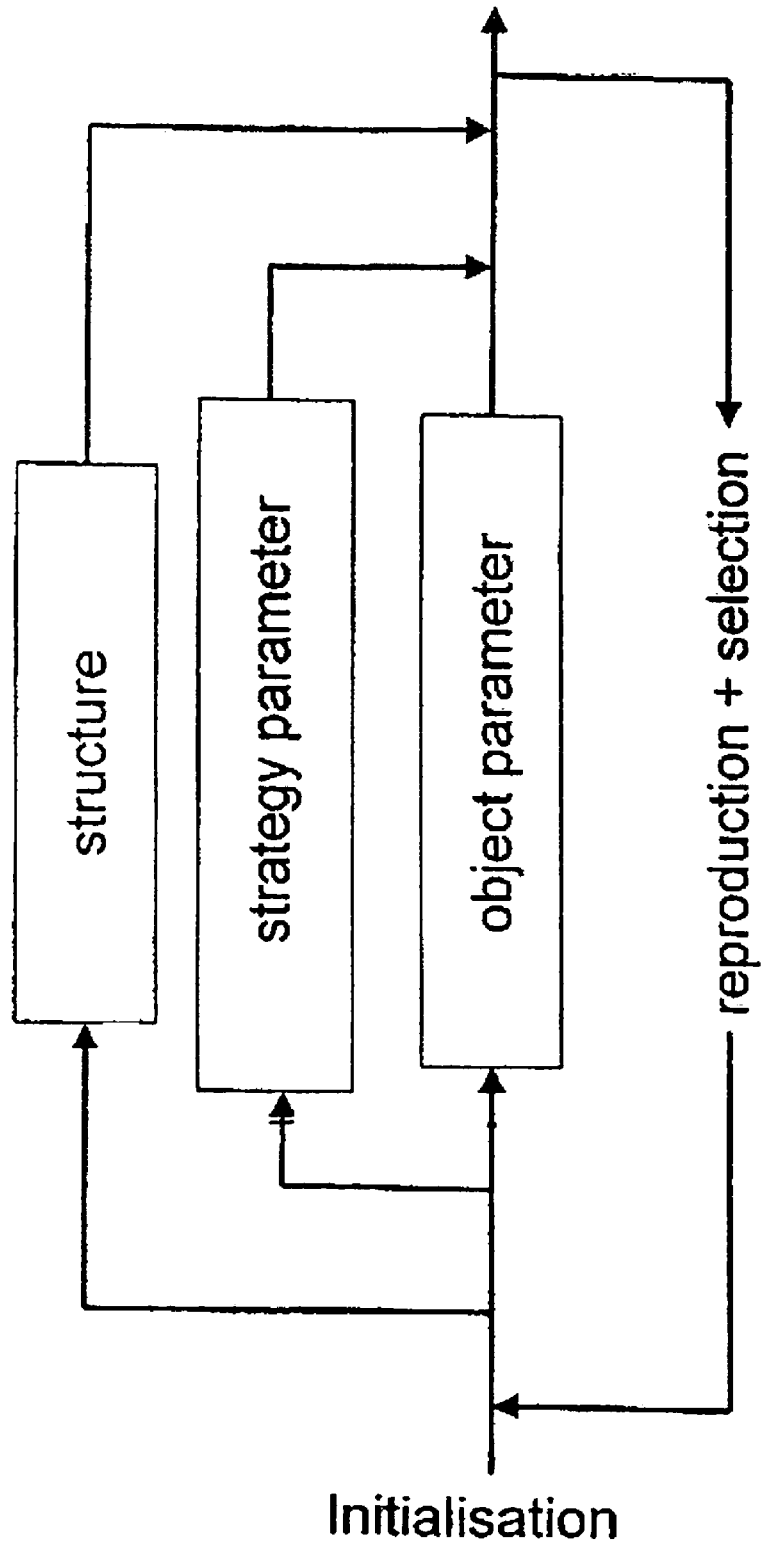
FIG. 6 shows a technology for implementing a hierarchical design optimization using evolutionary algorithms according to the present invention.

Reference is also made to FIG. 6 showing an embodiment of an application of the above hierarchical design optimization principle in the case of evolutionary algorithms. According to this technique the representation as well as the strategy and object parameters are mutated.

Some principles of this technique are derived from U.S. patent application Ser. No. 10/080,742 entitled "Strategy Parameter Adaptation in Evolution Strategies," filed on Feb. 21, 2002, and now published as U.S. Pat. No. 7,243,056, the disclosures of which are hereby incorporated by reference in its entity.

Another aspect of the hierarchical design optimization according to one embodiment of the present invention refers to the combination of an optimization algorithm, e.g., an evolution strategy and an experimental set-up 200 of the surface alterations that allows to change surfaces starting with the overall shape and proceeding via more detailed changes in local surface areas. Since the design optimization problem in principle is a very high-dimensional one, adequate measures have to be taken to decompose the problem. This way, the optimization of fine details in local areas can be combined with overall changes of the shape. In the context of the proposed solutions for the alteration of the shape, a hierarchical two-dimensional array of pistons 204 with variable lengths (looking like a 3D grid) can be designed. Thereby, a number of pistons 204 (or in a discrete embodiment, cuboids 301) are used for the overall shape control during the initial phase of the experimental design optimization, whereas the devices 206a+b controlling the detailed shape are subsequently added in later optimization phases according to appropriate measures.

Alternatively, blocks 302 of pistons 204 or cuboids 301 may define (virtual) larger blocks 302 while simultaneously being controlled; the size of these blocks 302 is reduced in later optimization phases. Additionally or alternatively the position of pistons 204 can be mutated during the optimization process. Therefore, the term "virtual" block structure or design refers to the arrangement of sub-blocks or in general sub-structures that are controlled in such a way that they behave as one solid block or structure. Whether each sub-block or structure is adapted individually or as a virtual block or structure is controlled by the changes in the representation.

Another embodiment according to the present invention includes a hierarchical set-up 200 for other shape control scenarios. In case of fluid-filled pockets, again (virtual) blocks of pockets can be defined for a simultaneous control. In addition, pocket walls can be designed in such a way that they are variable and can be moved by simple mechanical procedures to modify the representation. For magnetic or electric field based control, the area of influence of these devices can also be adapted. This leads not just to a hierarchical experimental set-up 200 but also to one where the overlap between different magnetic control units is altered.

Generally, the mutation rates of the optimization with different hierarchical levels are set such that the mutation rate is the lower the higher the hierarchical level. E.g. the mutation rate of the representation is usually set to be lower (slower) than the mutation rate of the values of the parameters. Therefore, according to one embodiment of the invention, different hierarchical levels of optimization can be performed.

Optimization: In one embodiment of the present invention, the optimization algorithm can run on any computer 103 and/or 103a+b connected in one way or the other to the computer 102, which controls the experimental set-up 200. In an alternative embodiment, the optimization algorithm uses the experimental set-up 200 only as one particular method for evaluating the quality of designs. This method may be combined in one embodiment with, for example, a CFD solver and meta-models, like ANNs or response surface models. In this embodiment, the computer 103b might belong to a computer cluster that is physically remote from the experimental hardware set-up 200. Thereby, the computer 103 which hosts said optimization algorithm is in contact with the computer 102 which controls the experimental set-up 200, for example, via any form of a computer network, e.g. local area network, wireless network, corporate network (intranet), a secured Internet connection 504, or the like. The results of the experimental optimization can directly be combined with other methods due to its autonomy. The interaction between and the control of the different evaluation methods can be taken from FIG. 5. The results of the experimental optimization can in turn be used to update and improve the model fidelity in, for example, neural networks using online learning. In one embodiment of the present invention, the focus is on using EAs as optimization tools due to their robustness and reliability even for complex problems. However, other embodiments of the proposed methods of the present invention can be combined with any optimization algorithm that does only need the quality of different designs for the optimization; examples are Simulated Annealing and Tabu Search (Tabu search is an iterative procedure designed for the solution of optimization problems, see e.g., J. W. Barnes, M. Laguna and F. Glover, "Intelligent Scheduling Systems", D. E. Brown and W. T. Scherer (Eds.), Kluwer Academic Publishers, 101-127 (1995), incorporated herein by reference in its entirety. Simulated annealing is a Monte Carlo approach for minimizing such multivariate functions).

Following, an optimization for application domains shall be presented in two sample embodiments. In an EA embodiment according to the present invention, optimization steps to be applied can be described as follows:

Process Initialization: A population of specific parameter vectors (possibly of varying length and representations) is stored within the EA running on a computer 102. For instance, the parameter vectors may describe the position of pistons 204 (or blocks thereof for the hierarchical case) or, alternatively, the strength of magnets altering the surface 202 of a design consisting of a flexible (magnetic) material that is subject to the fluid dynamics (FD) tests in the wind tunnel 104 as depicted in FIG. 2.

Set-Up Adjustment P2 (adjusting the surface structure 202 of an experimental set-up 200 according to the optimized parameters): The parameter set mentioned above is autonomously sent to the unit 206a that controls the pistons 204 or magnets, which results in a newly formed surface 202 of the underlying design to be optimized.

Measurement P3 (measuring dynamic properties of the adjusted experimental surface structure 202) and Feedback P4 (feeding back the measurement results as quality values for the next cycle of the optimizing step): The FD properties of the new design (or results of these properties like down pressure, or the like.) are tested and then autonomously sent back to the computer 102.

Looping: the first two steps are repeated until all parameter vectors in the population have been tested and the quality values of their corresponding designs have been determined.

Optimization Process P1 (optimizing parameters of at least one virtual surface structure 202): The EA running on the computer 102 uses the quality values to select the best parameter vectors for the parent population of the next generation. Additionally, the resolution of the 2D array of pistons 204 may be adapted in a hierarchical manner. For this purpose, a variable length representation for EAs has to be used. Applying the usual evolutionary variation operators, like mutation and recombination, creates the next generation of parameter vectors.

Process Termination: In case the best solution has already been found, the optimization process P1 is stopped; otherwise the second through fifth steps are repeated.

Several other useful embodiments according to the present invention shall briefly be described.

Optimization of the underside of automobiles: In this embodiment, a full model of a car is subject to measurements in the wind tunnel 104. The underside is represented by rectangular parallelepipeds 301 (cuboids) which are made of an appropriate material. Thereby, the relative positions of said cuboids 301 to each other and the rest of the car are controlled by micro motors. The mechanical control unit 206a is hidden inside the model car. Since a hierarchical representation is applied, an evolution strategy can be chosen. In this context, virtual blocks 302 of cuboids 301 are defined and represented whose size (and thus the length of the representation) is optimized during the evolutionary search besides the actual optimization P1 of the length of said cuboids 301. Thereby, measured properties could be the air resistance index and the noise level.

Optimization of the front or rear wing of a racing car: In this embodiment, the front wing of the racing car is given by a stiff but flexible material 202 that contains different pockets which are filled with oil. The pressure of the oil is controlled by means of a unit 206a that is hidden in the cockpit of the car. Walls whose permeability can be controlled with the aid of electrical currents separate the pockets. In this way, the optimization process P1 can again be organized in a hierarchical fashion, which is very important due to the complexity of the problem. The pressure of the different pockets and the permeability of the walls are represented by real-valued numbers. Thereby, the algorithm changes the numbers according to the applied optimization method. The experimental set-up 200 is combined with a CFD solver and an ANN that serves as a meta-model. In this way, the accurate data obtained by the experimental simulations can directly be used for an online learning process to improve the accuracy of the network model. In this connection, measured properties of the racing car model can be, for example, air resistance values or down pressure.

Optimization of a transonic compressor cascade: One embodiment of the present invention can be designed to resolve a major issue is the development of a new aerodynamic design for a transonic compressor cascade, i.e., a series of airfoil layers consisting of rotor and stator blades found within the gas turbines that power jet-propelled aircraft. This issue is essentially a fluid dynamics optimization problem: the streaming conditions around the fixed "stator" blades, and the rotor blades determine the efficiency of the whole turbine.

The embodiments of the present invention described above present several benefits and advantages vis-à-vis conventional solutions. Some of these advantages and benefits are summarized below.

Optimization algorithms based on experimental measurements have one main advantage compared to those based on simulations: They are more exact, in particular because they take secondary flow field effects into account. Of course, this comes at the expense of a much more difficult, time- and resource-consuming hardware set-up 200. By contrast, one embodiment of present invention proposing a method of an autonomous set-up minimizes these drawbacks by using appropriate approaches to modify the shape and the surface 202 of a given design. For this purpose, it combines the experimental optimization with the CFD- and meta-model based evaluation of a design by setting up a networked overall optimization environment. Thereby, the best of both domains can be obtained—accuracy when it is needed by the optimization algorithm and speed when accuracy is not decisive. The experimental data can directly be used to improve the meta-model, e.g., an ANN. Hierarchical design optimization can be used to achieve a decomposition of the overall problem. In the embodiments of the present invention using this principle, the algorithmic variable length representation is combined with a hierarchical organization of the modified shapes or surfaces 202 by, for example, defining (virtual) blocks 302 of adjustment elements 301.

What we claim is:

1. A method for iteratively optimizing a shape of an object, the method comprising:
   (a) calculating on a computer a set of parameter values by a first optimization algorithm or a second optimization algorithm depending on quality values from a set of initial parameters, the set of initial parameters representing a shape of an object having at least one continuous surface structure;
   (b) automatically adjusting hardware setup comprising a plurality of actuators coupled to the computer through an interface, the plurality of actuators controlled according to the calculated set of parameter values in order to alter a shape of the object with respect to the set of calculated parameter values;
   (c) measuring dynamic properties of the adjusted hardware setup;
   (d) retrieving measured dynamic properties by the computer;
   (e) evaluating the measured dynamic properties by the computer to obtain updated quality values;
   (f) repeating (a) through (e) until a set of optimized parameter values with respect to the measured dynamic properties are obtained based on the updated quality values; and
   (g) storing the set of the optimized parameter values in a computer memory.

2. The method of claim 1, wherein the step of calculating the set of parameter values comprises the step of changing the number of said parameter values.

3. The method of claim 1, wherein the first optimization algorithm comprises an Evolutionary Algorithm (EA).

4. The method of claim 1, wherein the second optimization algorithm comprises at least one of a Simulated Annealing (SA) and a Tabu Search (TS) algorithm.

5. The method of claim 1, wherein the surface structure to be optimized is superimposed to a second predefined surface structure.

6. The method of claim 1, further comprising evaluating additional quality values by a Computational Fluid Dynamics (CFD) solver responsive to measuring the dynamic properties.

7. The method of claim 1, further comprising evaluating additional quality values by an Artificial Neuronal Network (ANN) or a Response Surface Model (RSM) responsive to measuring the dynamic properties.

8. A computer program stored in a computer readable storage medium structured to store instructions executable by a processor for iteratively optimizing dynamic properties of a shape of an object, the instructions, when executed cause the processor to:
   (a) calculate a set of parameter values by a first optimization algorithm or a second optimization algorithm depending on quality values from a set of initial parameters, the set of initial parameters representing a shape of an object having at least one continuous surface structure;
   (b) automatically adjust hardware setup comprising a plurality of actuators coupled to a computer through an interface, the plurality of actuators controlled according to the calculated set of parameter values in order to alter the shape of the object with respect to the set of calculated parameter values;
   (c) measure dynamic properties of the adjusted hardware setup;
   (d) retrieve measured dynamic properties;
   (e) evaluate the measured dynamic properties to obtain updated quality values;
   (f) repeat (a) through (e) until a set of optimized parameter values with respect to the measured dynamic properties are obtained based on the updated quality values; and
   (g) store the set of the optimized parameter values in a computer memory.

9. A method for iteratively optimizing a continuous surface of a road vehicle, comprising:
   (a) calculating on a computer a set of parameter values by a first optimization algorithm or a second optimization algorithm depending on quality values from a set of initial parameters, the set of initial parameters representing a shape of a road vehicle including at least one continuous surface;
   (b) automatically adjusting hardware setup comprising a plurality of actuators coupled to the computer through an interface, the plurality of actuators controlled according to the calculated set of parameter values;
   (c) measuring dynamic properties of the adjusted hardware setup;
   (d) retrieving measured dynamic properties by the computer;
   (e) evaluating the measured dynamic properties by the computer to obtain updated quality values;
   (f) repeating (a) through (e) until a set of optimized parameter values with respect to the measured dynamic properties are obtained based on the updated quality values; and
   (g) storing the set of the optimized parameter values in a computer memory.

10. A closed-loop control system for iteratively optimizing a shape of an object, the system comprising:
   a computing device for calculating a set of parameter values by a first optimization algorithm or a second optimization algorithm depending on quality values from a set of initial parameters, the set of initial parameters representing a shape of an object having at least one continuous surface structure;
   an interface for automatically adjusting hardware setup comprising a plurality of actuators by controlling the plurality of actuators according to the calculated set of parameter values in order to alter a shape of the object with respect to the set of calculated parameter values; and
   a measurement control unit for measuring properties of the adjusted hardware setup, the measured properties evaluated by the computing device to obtain updated quality values;
   wherein the computing device, the hardware setup, and the measurement control unit repeat calculating the set of parameter values, adjusting the experimental hardware setup, and obtaining the updated quality values with respect to the measured dynamic properties until optimized parameter values are obtained based on the updated quality values.

11. The system of claim 10, wherein the first optimization algorithm comprises an Evolutionary Algorithm (EA).

12. The system of claim 10, wherein the second optimization algorithm comprises at least one of a Tabu Search (TS) algorithm and Simulated Annealing (SA) algorithm.

13. The system of claim 10, wherein the surface structure to be optimized is superimposed to a second predefined surface structure.

14. The system of claim 10, further comprising a second computing device for evaluating the quality values by a Computational Fluid Dynamics (CFD) solver.

15. The system of claim 14, wherein the second computing device also evaluates the quality values by an Artificial Neuronal Network (ANN) or a Response Surface Model (RSM).

* * * * *